(12) United States Patent
Yordanov

(10) Patent No.: US 8,261,272 B2
(45) Date of Patent: Sep. 4, 2012

(54) METHOD AND SYSTEM FOR MULTITHREADED REQUEST DISPATCHING

(75) Inventor: Diyan Yordanov, Sofia (BG)

(73) Assignee: SAP AG, Walldorf (DE)

( * ) Notice: Subject to any disclaimer, the term of this patent is extended or adjusted under 35 U.S.C. 154(b) by 1025 days.

(21) Appl. No.: 12/022,429

(22) Filed: Jan. 30, 2008

(65) Prior Publication Data

US 2008/0271044 A1 Oct. 30, 2008

Related U.S. Application Data

(60) Provisional application No. 60/926,989, filed on Jun. 30, 2007.

(51) Int. Cl.
*G06F 9/46* (2006.01)
(52) U.S. Cl. ......... 718/102; 718/107; 718/108; 709/203
(58) Field of Classification Search ........................ None
See application file for complete search history.

(56) References Cited

U.S. PATENT DOCUMENTS

| 6,704,806 B1* | 3/2004 | Decker ........................... 719/324 |
| 2002/0065875 A1* | 5/2002 | Bracewell et al. ............. 709/203 |
| 2003/0056200 A1* | 3/2003 | Li et al. ........................... 717/128 |
| 2009/0125907 A1* | 5/2009 | Wen et al. ...................... 718/101 |

* cited by examiner

*Primary Examiner* — Emerson Puente
*Assistant Examiner* — Sisley Kim

(57) ABSTRACT

A method and a system are described that involve processing a request in multiple threads and dispatching the request to a set of applications. The method includes receiving the request, wherein the request contains application context and session data, creating a request context object and associating it with the application context and the session data, storing an identifier of a first thread that processes the request in the request context object associated with the thread, creating a set of threads from the first thread to process the request in parallel threads, each thread in the set having a unique identifier and inheriting the request context object from the first thread, and invoking a request dispatcher on each thread in the set to forward the request to the set of applications.

13 Claims, 3 Drawing Sheets

METHOD AND SYSTEM FOR MULTITHREADED REQUEST DISPATCHING

CROSS REFERENCE TO RELATED APPLICATION

This application claims priority from Provisional Application No. 60/926,989 entitled "Web Container et al." and filed on Apr. 30, 2007, the teaching of which is incorporated herein by reference.

FIELD OF INVENTION

Embodiments of invention relate generally to the software arts, and, more specifically, to dispatching a request from an application to a plurality of applications to be processed in parallel threads in an application server environment.

BACKGROUND

In computer programming a thread is a placeholder for information associated with a single use of a program that can handle multiple concurrent users. From the program's point-of-view, a thread serves one individual user or a particular service request. If multiple users are using the program or concurrent requests from other programs occur, a thread is created and maintained for each of them. The thread allows a program to know which user is being served as the program alternately gets re-entered on behalf of different users.

Multiple threads can be executed in parallel on many computer systems. This multithreading generally occurs by time slicing (similar to time-division multiplexing), wherein a single processor switches between different threads, in which case the processing is not literally simultaneous, for the single processor is really doing only one thing at a time. This switching can happen so fast as to give the illusion of simultaneity to an end user. For instance, many personal computers today only contain one processor core, but one can run multiple programs at once, such as typing in a document editor while listening to music in an audio playback program; though the user experiences these things as simultaneous, in truth, the processor quickly switches back and forth between these separate processes.

Multithreading is a popular programming and execution model that allows multiple threads to exist within the context of a single process, sharing the process' resources but able to execute independently. The threaded programming model provides developers with a useful abstraction of concurrent execution.

There are scenarios where an application located on an application server may start multiple threads for processing a single client request. For example, a weather application may need to include different meteorological information from different sources as every source is presented by an additional application. One source may provide temperature, another source wind speed, a third source may provide humidity, and so on. In this case, the weather application creates a number of new threads. Each of these threads has to process the initial client request in the corresponding application of the number of applications. In terms of Java 2 Platform, Enterprise Edition (J2EE), this means that the initial client request has to be forwarded to these applications. The new threads share the same client request and client response objects.

The request object has application context and session relative information associated with it, such as context path, servlet path, session information, etc. Each Web application is mapped to its own servlet context. This allows a Web container to route user requests to the appropriate application based on the requested Uniform Resource Identifier (URI). In terms of J2EE, application context and servlet context have same meaning. The servlet context defines a servlet's view of the Web application within which the servlet is running. Using a servlet context object, a servlet can log events, obtain Uniform Resource Locator (URL) references to resources, and set and store attributes that other servlets in the context can access. A session usually corresponds to one user, who may visit a site many times. The server can maintain a session in many ways such as using cookies or rewriting URLs. Common information stored in session variables is name, id, and preferences. The server creates a new session object for each new user, and destroys the session object when the session expires.

There may be a number of problems related to the scenario described above. One problem may be related to the session management mechanism. Each application context is associated with one session domain. To forward the request from one application to another, the application context has to be switched. Switching the application context means switching of the session domain. Each session domain has corresponding session handler and session request objects. In this context, switching the application context means replacing the current session with a new session related to the target application. This new session becomes the active one. When another thread (in parallel) tries to switch to the same context, it may be a problem because this may replace the newly created session with a new one.

Another problem may be with the context related information such as the context path and the servlet path. Context path and servlet path are request path elements. The request path leads to a servlet servicing a request. When two parallel threads are processing the same request in two different application contexts, it is not guaranteed that this information is correct for each of the threads, as each of them can change it according to its own needs. This problem comes from the Java™ Servlet specification. According to the specification (SRV. 8), when the request is forwarded by a request dispatcher to another application, the path element of the request object exposed to the target servlet must reflect the path used to obtain the request dispatcher. In that way the second application will overwrite the path elements set in the request during first forward of the request.

One embodiment of having one and the same request and response objects in all processing threads but with different context and session information is to associate this information with the processing thread's thread context. In addition, the request objects need to be thread safe. In computer programming, thread safety describes a program portion or routine that can be called from multiple programming threads without unwanted interaction between the threads. By using thread safe routines, the risk that one thread will interfere and modify data elements of another thread is eliminated by circumventing potential data race situations with coordinated access to shared data.

FIGURES

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one embodiment.

SUMMARY

A method and system for processing a request in multiple threads and dispatching the request to a set of applications. The method includes receiving the request, wherein the request contains application context and session data, creating a request context object and associating it with the application context and the session data, storing an identifier of a first thread that processes the request in the created request context object, creating a set of threads from the first thread to process the request in parallel threads, each thread in the set having a unique identifier and inheriting the request context object from the first thread, and invoking a request dispatcher on each thread in the set to forward the request to the set of applications.

DETAILED DESCRIPTION

Embodiments of present invention relate to receiving a client request at an application server, creating a set of threads to process the request in parallel, and forwarding the request to a number of applications using a request dispatcher.

Figure 1:
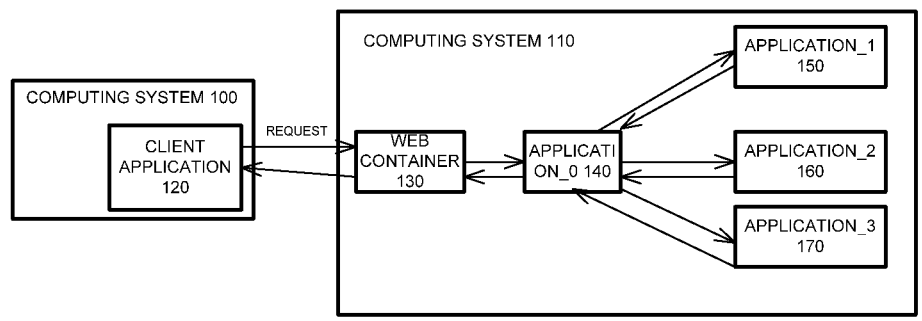
FIG. 1 is a block diagram of an embodiment for sending a request.

FIG. 1 is a block diagram of an embodiment of the invention for sending a request between computing system 100 and computing system 110. Computing system 110 may reside on the same or a remote physical machine. Within system 100, client application 120 is running. Client application 120 sends a request via a network protocol, such as Hypertext Transfer Protocol (HTTP). System 100 sends the request to computing system 110. Computing system 110 may be an application server. Computing system 100 and computing system 110 form a client-server architecture, wherein system 100 is the client side and system 110 is the server side. Computing system 110 receives the request sent from client application 120. The request is forwarded to Web container 130 for processing. Web container 130 provides network services via which requests and responses are sent, decodes Multi-Purpose Internet Mail Extensions based (MIME-based) requests, and formats MIME-based responses. Web container 130 also contains and manages servlets through their lifecycle.

Web container 130 invokes application_0 140. In one embodiment of the invention, application_0 140 needs to invoke additional applications to process the request. Therefore, application_0 140 invokes application_1 150, application_2 160, and application_3 170. In this embodiment of the invention, application_0 140 creates three threads to forward the request to each of the three applications. Each thread has to pass the request to the corresponding application and return a response to application_0 140. Application_0 140 then sends the aggregated response from the three applications to Web container 130. Finally, Web container 130 passes the response to client application 120. Although application_0 140 invokes application_1 150, application_2 160, and application_3 170 in sequence, the time slots between the invocations are considerably insignificant. In addition, the three applications process the request simultaneously and thus increase the performance period of the request processing.

Figure 2:
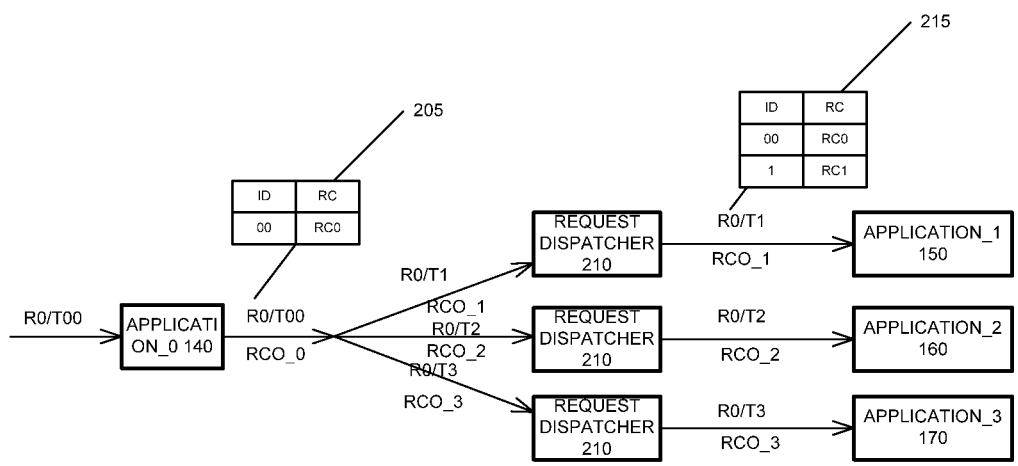
FIG. 2 is a block diagram of an embodiment for processing a request in parallel threads.
Figure 4:
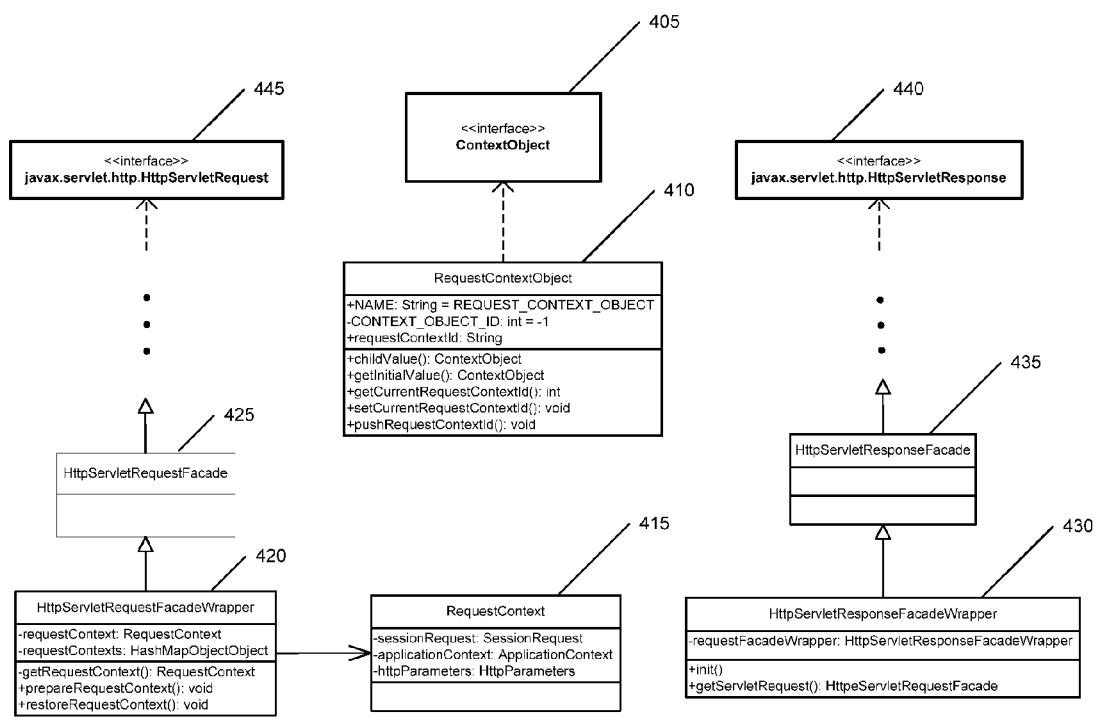
FIG. 4 is a relational diagram of an implementation of an embodiment of the invention.

FIG. 2 is a block diagram of an embodiment of the invention for processing a request in parallel threads. Client application 120 sends a request 0 (R0). R0 is passed via HTTP handling thread T0 to application_0 140. Every client request is processed in a separate thread (e.g. thread T0) by the Web container 130. Using a request's unified resource identifier (URI), Web container 130 is able to find the corresponding application for this request. In addition, when the application is invoked to process the request, the application may decide to process the request in multiple applications and thus, to start a set of new threads. Web container 130 registers a request context object in the thread management system of computing system 110. This request context object is implemented by a RequestContextObject class, which is shown in FIG. 4 and described further in the document. Registering the request context object ensures that every thread running in the thread system will have the request context object in its thread context. This request context object can be additionally initialized by the Web container with correct information. Application_0 140 receives R0 in thread T00 to process the request. Thread T00 has a unique identifier (ID) and an instance of the request context object registered in the thread context. This instance is request context object 0 (RCO_0). Web container 130 creates a request context_0 (RC0). This RC0 is responsible for storing all information of the request that is context and session sensitive. This information can be modified by the application that currently processes the request.

The thread T00 identifier is stored in RCO_0 and thus, initializing RCO_0 provided by the thread context of thread T00. R0 contains a table 205. In table 205 in R0, the RC0 associated with the request is registered by the thread identifier. The table contains two columns with a number of rows. The first column records the identifier from the RCO_0, which is the identifier of the thread, and the second column records the RC0 in which the thread is working in. The rows are filled in during processing the R0 by different threads. The RC0 and the thread T00 identifier are also stored in directly in R0.

Thread T00 creates a set of new threads to process R0 simultaneously. Thread T00 creates thread T1, thread T2, and thread T3. These new threads have their own instances of the request context object provided by the thread management system of computing system 110. For thread T1, the new request context object is RCO_1, for thread T2: RCO_2, and for thread T3: RCO_3. These new request context objects inherit the data from RCO_0 of the parent thread (the parent thread is thread T00). RCO_0 contains the identifier of the parent thread T00, thus each new thread inherits the identifier in its request context object. During creation process of threads T1, T2, and T3, each thread obtains its own unique identifier.

A request dispatcher 210 is invoked by each thread in the set: T1, T2, and T3. Request dispatcher 210 compares the identifier of the thread that currently processes the R0 with the identifier stored in the corresponding new request context object of the thread (RCO_1, RCO_2, and RCO_3). RCO_1, RCO_2, and RCO_3 contain the inherited identifier from the parent thread (the identifier of thread T00 from RC0_0). The request dispatcher 210 determines that the identifier of the current thread (i.e. T1, T2, or T3) and the identifier from the corresponding request context object, are different. Web container 130 creates a new request context for each thread in the set. For thread T1, the new request context is RC_1; for thread T2: RC_2; and for thread T3: RC_3.

Web container 130 associates the new request contexts, RC_1, RC_2, and RC_3 with new application data, such as application context, session request, HTTP parameters, and response object data. In each new request context object (RCO_1, RCO_2, and RCO_3), the Web container 130 stores the identifier of the current thread. In RCO_1, the Web container stores the identifier of thread T1; in RCO_2, the identifier of thread T2; and in RCO_3, the identifier of thread T3. The Web container 130 also preserves the identifier of the parent thread (e.g. the identifier of thread T00) in each of the request context objects RCO_1, RCO_2, and RCO_3. In the table 215 of the request, the new request context is registered with the corresponding thread identifier. This new entry is added in a separate row of the table. Each time the request is processed in a different thread and the request is forwarded to a new application, a new entry is registered in the table of the request. In one embodiment of the invention, the request may not be forwarded to a new application. In this case, the Web container uses the request context of the parent thread that is referenced by the identifier stored in the request context object of the thread.

In one embodiment, the request dispatcher 210 may determine that the identifier of a current thread and the identifier from the corresponding request context object (RCO_1, RCO_2, and RCO_3) of the current thread match. In this case, the request is processed in the same thread and no new request contexts are created. New request context is created when the request has to be processed in a different than the current thread.

Request dispatcher 210 is invoked to forward R0. If R0 has to be forwarded to another application (e.g., application_1 150, application_2 160, or application_3 170), then the request dispatcher 210 switches the application context to the new application context associated with the new request context, suspends the current session request and starts a new session request to a new session domain. R0 is received at application_1 150 via thread T1. R0 is also received at application_2 160 via thread T2. Via thread T3, R0 is received at application_3 170.

After R0 is processed at application_1 150, application_2 160, or application_3 170, request dispatcher 210 initiate restoring of the application context and session request back to the original application context and session request. The identifier of the parent thread T00 is restored as well along with the initial request context. The restoring of the initial context and session information is needed for correct further processing of the request back in the original application.

In one embodiment of the invention, after the request is received at a second application such as application_1 150, application_2 160, or application_3 170, the second application may decide to invoke a third application and forward the request. The steps described above are executed once again in the same order. This process continues until all needed applications are invoked. When the process reaches the last application, a response object is sent back in the chain. The response object is forwarded from an application to an application until it is received at the initial application.

Figure 3:
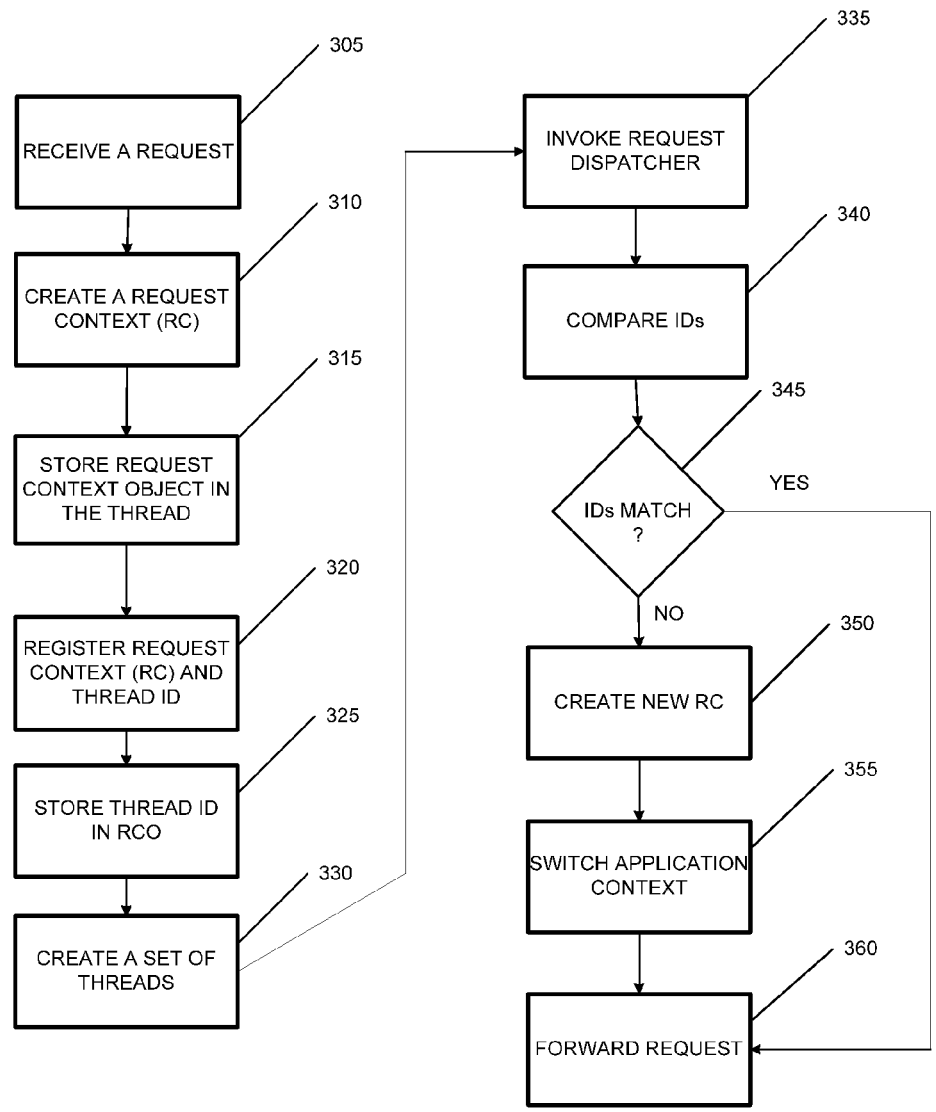
FIG. 3 is a flow diagram of an embodiment for multi-threaded request dispatching to a number of applications.

FIG. 3 is a flow diagram of an embodiment for multi-threaded request dispatching to a number of applications. At block 305, a request is received at computing system 110. The request is forwarded to Web container 130 for processing. The request is received at the Web container in a thread. The thread has a unique identifier. At block 310, a request context is created. The request context is associated with application and session data such as application context, session request, HTTP parameters, and response object data.

At block 315, a request context object is stored in a thread context of the thread that processes the request. At block 320, the request context is stored in a hash table of the request. At block 325, the identifier of the thread that currently processes the request is stored in the request context object.

At some point application_0 140 decides to invoke additional applications. For this purpose, new threads have to be created. At block 330, a set of new threads is created from the first thread. The first thread is a parent thread for the new threads. Each of the threads has a unique identifier. The new threads have their own request context objects with inherited data from request context object of the parent thread. The data includes the identifier of the parent thread as initial value.

At block 335, a request dispatcher 210 is invoked on each thread of the set to forward the request to another application. At block 340, the request dispatcher compares the identifier of a thread in the set with the identifier in request context object of the same thread. At block 345, the request dispatcher identifies if the two identifiers match. If the identifiers match, the process continues at block 360. If the identifiers do not match, the process continues at block 350.

At block 350, a new request context is created. The new request context is associated with new application and session data. In the request context object of the current thread, the identifier of the current thread is stored. In addition, the identifier of the parent thread is also preserved. In the table of the request, a new entry is recorded. The new entry contains the new request context keyed by the identifier of the current thread in the set.

At block 355, the request dispatcher switches the application context to the new application context by updating the values in the new request context. In addition, the current session request is suspended and a new session request is started for a new session domain. This session request is also stored in the new request context. At block 360, the request is forwarded to the new application (e.g., application_1 150, application_2 160, or application_3 170).

Application context, session request and request context object are restored to their original values. The restoring of the initial context and session information is needed for correct further processing of the request back in the original application. In one embodiment of the invention, the process may continue at block 335, if additional new applications have to be invoked.

FIG. 4 is a relational diagram that shows one embodiment of the invention. RequestContextObject class 410 defines a request context object. The request context object is created during start-up of Web container 130. RequestContextObject class 410 includes the following fields: 1) "NAME" that specifies the name of the request context object (RCO); 2) "CONTEXT_OBJECT_ID" that specifies the identifier with which the RCO is specified in the thread system of computing system 110; and 3) "requestContextId" that specifies which request context is to be used by the current processing thread. It is used as key in a table stored in the request. RequestContextObject class 410 implements ContextObject interface 405. RequestContextObject class 410 includes the following methods: 1) "childValue"—this method is called when a child thread is started; 2) "getInitialValue"—this method provides initial value of the RCO; 3) "String getCurrentRequestContextId" that returns the current request context identifier; 4) "setCurrentRequestContextId" that sets a new value for the request context identifier; and 5) "pushRequestContextId" that stores a new request context identifier, usually when a child thread is started.

RequestContext class 415 encapsulates the application context and session sensitive information in the request. It has references to ApplicationContext, SessionRequest, HttpParameters and response objects. These objects are passed to the request context when it is created. Later, these objects can be modified when the request is forwarded to another application.

HttpServletRequestFacadeWrapper class 420 extends HttpServletRequestFacade 425 and provides application context and session relative information from a request to the processing application. This information is associated with the request context. HttpServletRequestFacadeWrapper class 420 includes the following parameters: 1) "requestContext" that specifies a reference to the initial request context; 2) "threadId" that specifies the identifier of the thread that initially starts request processing; and 3) "requestContexts" that specifies a table that stores all request contexts for a specific request, used by different request handling threads in the different applications. HttpServletRequestFacadeWrapper class 420 includes also the following methods: 1) "getRequestContext" is responsible to determine and select the correct request context from the table of objects; 2) "prepareRequestContext" determines whether the request is going to be processed in a child thread and creates an initial request context to be used with the child thread; creates a new session request; 3) "restoreRequestContext" removes the request context; this method is called after request dispatcher 210 forwarded the request is completed and ends the session request and removes used request context.

HttpServletResponseFacadeWrapper class 430 extends HttpServletResponseFacade class 435 and implements the methods of javax.servlet.http.HttpServletRequest interface 445. Some of the methods defined in the javax.servlet.http.HttpServletRequest interface 445 depend from the application context and session information associated with the application in which the request is processed. Their implementation uses the request context returned by the getRequestContext method. Thus the results of these methods are different for different processing threads of the same request. HttpServletResponseFacadeWrapper class 430 includes the following methods: 1) "init" that stores reference to the request; and 2) "getServletRequest" that returns associated request object.

The HttpServletRequestFacade 425 and HttpServletResponseFacade class 435 indirectly implement javax.servlet.http.HttpServletRequest interface 445 and javax.servlet.http.HttpServletResponse interface 440 correspondingly. Both interfaces are part of the Java Development Kit (JDK) of Java 2 Platform, Enterprise Edition (J2EE) platform. These interfaces provide data for the request and response objects.

Elements of embodiments may also be provided as a machine-readable medium for storing the machine-executable instructions. The machine-readable medium is an article of manufacture and may include, but is not limited to, flash memory, optical disks, CD-ROMs, DVD ROMs, RAMs, EPROMs, EEPROMs, magnetic or optical cards, or other type of machine-readable media suitable for storing electronic instructions. For example, embodiments of the invention may be downloaded as a computer program, which may be transferred from a remote computer (e.g., a server) to a requesting computer (e.g., a client) by way of a communication link (e.g., a modem or network connection).

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

In the foregoing specification, the invention has been described with reference to the specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A computer implemented method comprising:
   receiving a request in a parent thread, the request including application context and session data of a first application, wherein the parent thread includes an identifier and a first instance of a request context object that stores the identifier;
   creating a request context associated with the application context and the session data of the first application;
   a processor associated with the computer creating a set of parallel threads as child threads of the parent thread to process the request in parallel, wherein at least one thread in the set of child parallel threads includes a unique identifier and a second instance of the request context object, wherein the second instance of the request context object inherits the stored identifier from the first instance of the request context object from the parent thread;
   invoking a request dispatcher on the at least one thread in the set of child parallel threads to forward the request to a second application to process the request;
   creating a new request context for the at least one thread of the set of child parallel threads and associating the new request context with a new application context and new session data of the second application;
   switching the application context and the session data of the first application to the new application context and the new session data of the second application for processing the request at the second application;
   restoring the application context and the session data of the parent thread in the first instance of the request context object after the request is processed at the second application;
   repeating the steps of invoking, creating, switching, and restoring for a group of applications that are required to process the request; and
   forwarding a response object from a last application of the group of the applications to the first application.

2. The method of claim 1, further comprises:
   comparing the unique identifier of the at least one thread of the set of parallel threads with the identifier inherited by the second instance of the request context object;
   creating the new request context for the at least one thread of the set of parallel threads and associating the new request context with the new application context and new session data of the second application if the unique identifier of the at least one thread of the set of parallel threads is different from the identifier of the parent thread; and
   storing the unique identifier of the at least one thread of the set of parallel threads in the second instance of the request context object of the at least one thread of the set of parallel threads.

3. The method of claim 2 further comprising registering the new request context and the stored unique identifier of the at least one thread of the set of parallel threads in a table of the request.

4. The method of claim 2, wherein storing the unique identifier further comprises further comprising storing the identifier of the parent thread that created the at least one thread of the set of parallel threads.

5. The method of claim 4 further comprising:
restoring the application context, the session data and the identifier of the parent thread in the first instance of the request context object after the request is processed at the second application.

6. A computing system comprising:
a processor;
a server running a first application executed by the processor, wherein the first application receives a request that includes application context and session data of the first application;
a request context associated with the application context and the session data of the first application;
a web container to associate a parent thread with the request, wherein the parent thread is identified by an identifier stored in a first instance of a request context object;
a set of parallel threads created as child threads of the parent thread to process the request in parallel, wherein at least one thread in the set of child parallel threads has a unique identifier and a second instance of the request context object, wherein the second instance of the request context object inherits the identifier from the first instance of the request context object from the parent thread;
a new request context created for the at least one thread of the set of child parallel threads and associated with a new application context and new session data of a second application; and
a request dispatcher to forward the request to the second application to process the request, wherein the request dispatcher is invoked on the at least one thread in the set of child parallel threads, and the request dispatcher performs operations comprising:
switching the application context and the session data of the first application to the new application context and the new session data of the second application for processing the request at the second application; and
restoring the application context and the session data of the parent thread in the first instance of the request context object after the request is processed at the second application, wherein the steps of switching and restoring are repeated for a group of applications that are required to process the request; and
forwarding a response object from a last application of the group of the applications to the first application.

7. The computing system of claim 6, wherein the request dispatcher compares the unique identifier of the at least one thread in the set of parallel threads with the identifier inherited by the second instance of the request context object of the at least one thread in the set of parallel threads.

8. The computing system of claim 6, further comprising:
the second application to receive the forwarded request.

9. A non-transitory computer-readable medium having instructions therein that when executed by the machine, cause the machine to:
receive a request in a parent thread, the request including application context and session data of a first application, wherein the parent thread includes an identifier and a first instance of a request context object that stores the identifier;
create a request context associated with the application context and the session data of the first application;
create a set of parallel threads as child threads of the parent thread to process the request in parallel wherein at least one thread in the set of child parallel threads includes a unique identifier and a second instance of the request context object, wherein the second instance of the request context object inherits the identifier from the first instance of the request context object from the parent thread;
invoke a request dispatcher on the at least one thread in the set of child parallel threads to forward the request to a second application to process the request;
create a new request context for the at least one thread of the set of child parallel threads and associating the new request context with a new application context and new session data of the second application;
switch the application context and the session data of the first application to the new application context and the new session data of the second application for processing the request at the second application;
restore the application context and the session data of the parent thread in the first instance of the request context object after the request is processed at the second application;
repeat the steps of invoking, creating, switching, and restoring for a group of applications that are required to process the request; and
forward a response object from a last application of the group of the applications to the first application.

10. The computer-readable medium of claim 9, wherein instructions causing the machine to invoke a request dispatcher comprise instructions causing the machine to:
compare the unique identifier of the at least one thread of the set of parallel threads with the identifier inherited by the second instance of the request context object;
create the new request context for the at least one thread of the set of parallel threads and associating the new request context with the new application context and new session data of the second application if the unique identifier of the at least one thread of the set of parallel threads is different from the identifier of the parent thread; and
store the unique identifier of the at least one thread of the set of parallel threads in the second instance of the request context object.

11. The computer-readable medium of claim 10 having instructions that when executed further cause the machine to:
register the new request context and the stored unique identifier of the at least one thread of the set of parallel threads in a table of the request.

12. The computer-readable medium of claim 10 having instructions that when executed further cause the machine to:
store the identifier of the parent thread that created the at least one thread of the set of parallel threads.

13. The computer-readable medium of claim 12 having instructions that when executed further cause the machine to:
restore the application context, the session data and the identifier of the parent thread in the first instance of the request context object after the request is processed by the second application.

* * * * *